(12) United States Patent
Motto et al.

(10) Patent No.: US 11,639,711 B2
(45) Date of Patent: May 2, 2023

(54) METHODS AND SYSTEMS FOR PERFORMANCE LOSS ESTIMATION OF SINGLE INPUT SYSTEMS

(71) Applicant: Siemens Aktiengesellschaft, Munich (DE)

(72) Inventors: Alexis Motto, Princeton, NJ (US); Amit Chakraborty, East Windsor, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/270,468

(22) PCT Filed: Aug. 31, 2018

(86) PCT No.: PCT/US2018/049014
§ 371 (c)(1),
(2) Date: Feb. 23, 2021

(87) PCT Pub. No.: WO2020/046358
PCT Pub. Date: Mar. 5, 2020

(65) Prior Publication Data
US 2021/0324835 A1  Oct. 21, 2021

(51) Int. Cl.
*F03D 17/00* (2016.01)
*G01M 99/00* (2011.01)
(Continued)

(52) U.S. Cl.
CPC .......... *F03D 17/00* (2016.05); *G01M 99/008* (2013.01); *G05B 17/02* (2013.01); *F05B 2260/83* (2013.01); *G05B 1/01* (2013.01); *G05B 6/02* (2013.01); *G05B 23/00* (2013.01)

(58) Field of Classification Search
CPC .. F03D 17/00; F03D 2260/83; G01M 99/008; G05B 17/02; G05B 1/01; G05B 6/02; G05B 23/00; F05B 2260/83
See application file for complete search history.

(56) References Cited

U.S. PATENT DOCUMENTS

2011/0270450 A1  11/2011  Gujjar et al.

FOREIGN PATENT DOCUMENTS

| CN | 103762620 A | * | 4/2014 |
| CN | 107885959 A | * | 4/2018 |

(Continued)

OTHER PUBLICATIONS

Oh et al. ("Comparison and verification of the deviation between guaranteed and measured wind turbine power performance in complex terrain", Energy, vol. 85, 2015, pp. 23-29, ISSN 0360-5442) (Year: 2015).*

(Continued)

*Primary Examiner* — Daniel R Miller
*Assistant Examiner* — Christian T Bryant

(57) ABSTRACT

A method for identifying underperforming agents in a multi-agent cooperative system includes receiving information relating to the performance of each agent in the multi-agent system, calculating an estimated extracted resource value of each agent based on the received information, comparing the estimated extracted resource value of each agent to a threshold value, calculating a performance index based on the comparison and identifying an agent as an under-performing agent based on the performance index. A system for identifying under-performing agents in a plurality of agents in a multi-agent cooperative system includes a performance analyzing processor, a communications port for receiving state information for each agent and control information for each agent, a classifier for identifying a subset of agents in the (Continued)

plurality of agents that are performance comparable and an optimizer configured to identify an under-performing agent of performance comparable agents and generate updated control information for the identified under-performing agent.

18 Claims, 3 Drawing Sheets

(51) Int. Cl.
*G05B 17/02* (2006.01)
*G05B 6/02* (2006.01)
*G05B 1/01* (2006.01)
*G05B 23/00* (2006.01)

(56) References Cited

FOREIGN PATENT DOCUMENTS

| CN | 108022058 A | * | 5/2018 |
|---|---|---|---|
| EP | 2514969 A2 | | 10/2012 |
| WO | 2018121668 A1 | | 7/2018 |

OTHER PUBLICATIONS

Khatab ("Performance Analysis of Operating Wind Farms", Uppsala University Department of Earth Sciences, Campus Gotland, Sep. 2017 ) (Year: 2017).*
Wang et al. ("Modelling Analysis of Methods for Wind Turbine Annual Energy Production", 4th International Conference on Sustainable Energy and Environmental Engineering (ICSEEE 2015), Jan. 2016) discloses Modelling Analysis of Methods for Wind Turbine Annual Energy Production. (Year: 2016).*
Lam ("Development of wind resource assessment methods and application to the Waterloo region", Uppsala University Department of Earth Sciences, Campus Gotland, 2013) (Year: 2013).*
Smith et al. , Development of a Generic Wind Farm Scada System ETSU W/45/00526/REP DTI/Pub URN 01/1124 (Year: 2001).*
PCT International Search Report and Written Opinion of International Searching Authority dated May 20, 2019 corresponding to PCT International Application No. PCT/US2018/049014; 14 pages.
Park Jinkyoo et al.: "A data-driven, cooperative wind farm control to maximize the total power production", Applied Energy, Elsevier Science Publishers, GB, vol. 165, Dec. 31, 2015 (Dec. 31, 2015), pp. 151-165, XP029400213 / 31.12.2015.

* cited by examiner

METHODS AND SYSTEMS FOR PERFORMANCE LOSS ESTIMATION OF SINGLE INPUT SYSTEMS

CROSS-REFERENCE TO RELATED APPLICATIONS

This application is a national phase filing under 35 U.S.C. § 371 of International Patent Application No. PCT/US2018/049014, filed Aug. 31, 2018, which is incorporated by reference herein in its entirety.

TECHNICAL FIELD

This application relates to performance management for industrial systems.

BACKGROUND

The current industry-standard Wind turbine performance monitoring technology is based on a mapping of wind speed versus extracted energy. This mapping is called a power curve. The International Electrotechnical Commission standardized the estimation of the power curve using a nonparametric approach, known as the "binning method". Given the wind speed and extracted energy observation data, the binning method divides the domain of wind speed into a finite number of intervals or bins. The power curve is then obtained as a mapping of sample mean of wind speed versus sample mean of extracted energy using all observation data falling within each bin. For a given wind speed, the corresponding extracted energy is the sample conditional expected value of the extracted energy over the period considered: $\mathbb{E}[y_{ap}^{tb}|x_s^{tb}]$.

Once constructed, the power curve is then used to predict extracted energy at any wind speed, by mapping or interpolation. This methodology requires prior construction of power curves, which may be meaningful only after observing data over a sufficiently long period of time.

More recent methodology proposes to use machine learning to create multi-variable models of turbine performance, when sufficient information is available. An ensemble of regression trees to predict turbine extracted energy as a function of several inputs, including shear, wind speed, and hub height turbulence has been proposed. These methods are instances of the "random forest" method. Other approaches include a list of commonly-used input variables used in an additive multivariate kernel method that can include the aforementioned weather factors as a new power curve model. Note that a power curve, in this case, is a high-dimensional manifold. Multi-variable methods require prior construction of high-dimensional power curves, which may be meaningful only after observing data over a sufficiently long period of time. In essence, they require more data and are more difficult to understand and to implement than the current standard practice.

SUMMARY

According to a method for identifying underperforming agents in a multi-agent cooperative system, the method includes, in a performance analyzer processor, receiving information relating to the performance of each agent of a plurality of agents in the multi-agent cooperative system, determining a threshold value of an extracted resource value of each agent representative of full performance of the corresponding agent, calculating an estimated extracted resource value of each agent based on the received information, comparing the estimated extracted resource value of each agent to the threshold value, calculating a performance index based on the comparison and identifying an agent as an under-performing agent based on the calculated performance index for the agent. The agents may be wind turbines and the multi-agent cooperative system is a wind farm. The performance information may include state information for each wind turbine in the wind farm and control information for each wind turbine in the wind farm. The state information and the control information may be used to calculate the performance index. Other information for calculating a performance index may include weather information. To capture dynamic information relating to less observable weather factors, the weather information excludes wind speed information.

According to aspects of some embodiments, an optimization is performed on an identified under-performing agent to calculate updated control information and the identified under-performing agent is updated with the updated control information. The updated control information is utilized by the under-performing agent and updated state information is received from the updated agent and an updated performance index for corresponding agent is calculated. When comparing agents, the threshold value of the extracted resource value is calculated for a subset of the plurality of agents, wherein each agent in the subset is performance comparable with each other agent in the subset. Performance comparable refers to each agent in the subset of performance comparable agents having the same configuration as each other agent in the subset of performance comparable agents. The performance index may be calculated by integrating the estimated extracted resource value of each agent over a selected time interval.

According to aspects of embodiments of this disclosure, a system for identifying under-performing agents in a plurality of agents in a multi-agent cooperative system includes a performance analyzing processor in communication with the multi-agent cooperative system, a communications port in the performance analyzing processor for receiving state information for each agent in the plurality of agents and control information for each agent in the plurality of agents, a classifier for identifying a subset of agents in the plurality of agents that are performance comparable and an optimizer configured to identify an under-performing agent of performance comparable agents and generate updated control information for the identified under-performing agent. An interface between the optimizer and the identified under-performing agent is configured to transfer the updated control information from the optimizer to the identified under-performing agent. Each agent in the plurality of agents is a wind turbine and the multi-agent cooperative system is a wind farm. The state information is state information representative of a state of each wind turbine in the wind farm and the control information is representative of control aspects of each wind turbine in the wind farm. The performance analyzing processor may further receive information relating to weather information relative to the wind farm, wherein the weather information excludes information relating to wind speed. Agents that are performance comparable have identical design characteristics. The performance analyzing processor may be further configured to calculate a performance index for each agent in a group of performance comparable agents and identify the under-performing agent based on the performance index. The performance index may be calculated as an integration of an estimated extracted resource of each agent over a selected time period.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

A wind turbine is a controlled system that converts kinetic energy from the ambient weather into electric energy. Wind turbines are an important asset in the renewable energy production portfolio. The U.S. Department of Energy (DOE) supports research and development towards achieving a 20% penetration of wind in electricity production in the United States by 2030. Wind turbines generally operate in remote sites under random weather conditions. It is often costly to access these remote locations. A site may be onshore or offshore.

Figure 1:
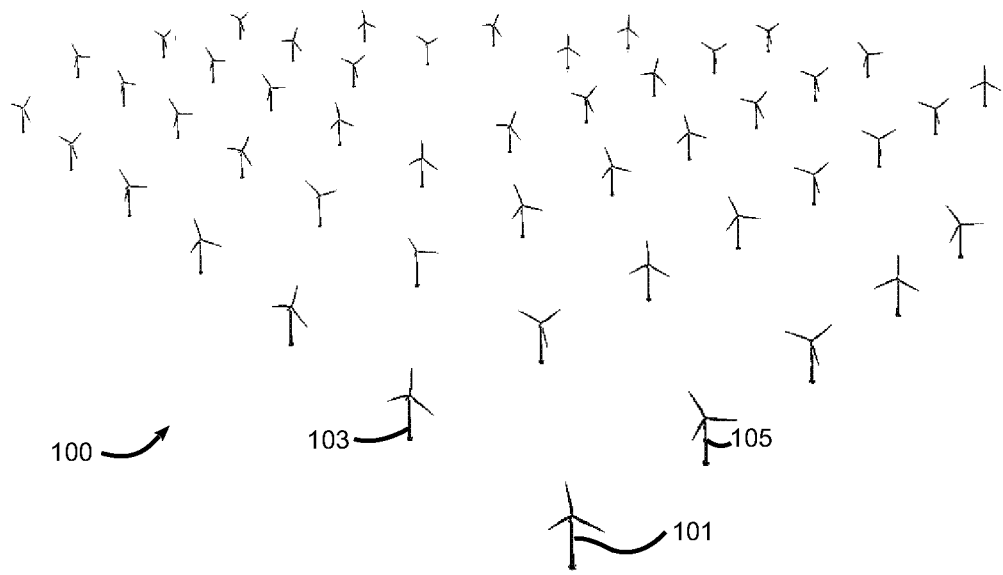
FIG. 1 shows a multi-agent wind turbine installation according to embodiments of the present disclosure.

FIG. 1 depicts a sample multiple-turbine offshore site 100. An array of wind turbines is arranged to convert wind energy to electrical energy. A first wind turbine 101 operates to other wind turbines, for example turbine 103 and turbine 105. It is of paramount energy relevance to monitor fleets of turbines in order to detect any under-performing turbines, to improve their energy extraction efficiency, or to schedule maintenance. Much of the research on wind turbine performance optimization has focused on single turbine settings. Maximizing the performance of turbines in a multi-turbine site is more complex due to inter-turbine aerodynamics. Hence much of the existing technology is highly inefficient for optimizing energy extraction from wind turbines.

For various reasons including environmental, social or political reasons, wind turbines are often located in remote locations. For example, wind turbine farms may be located at offshore locations. In these remote locations, it is difficult to detect or experience the conditions in which the turbine is operating. Dynamic environmental conditions create non-stationary or unknown probability terms that may affect the efficiency or operation of the turbines. The basic operation of a wind turbine is to convert the kinetic energy of air in motion as wind, into electrical energy through the rotation of a blade placed in the path of the airflow. Therefore, the main input variable for analyzing the performance of the turbine is wind speed and the main output variable is the electrical energy generated. However, the observed electrical output does not provide information as to how well the turbine is performing and the question exists as to whether given the current conditions, could the turbine perform more efficiently and generate more electrical energy than is being observed.

Figure 2:
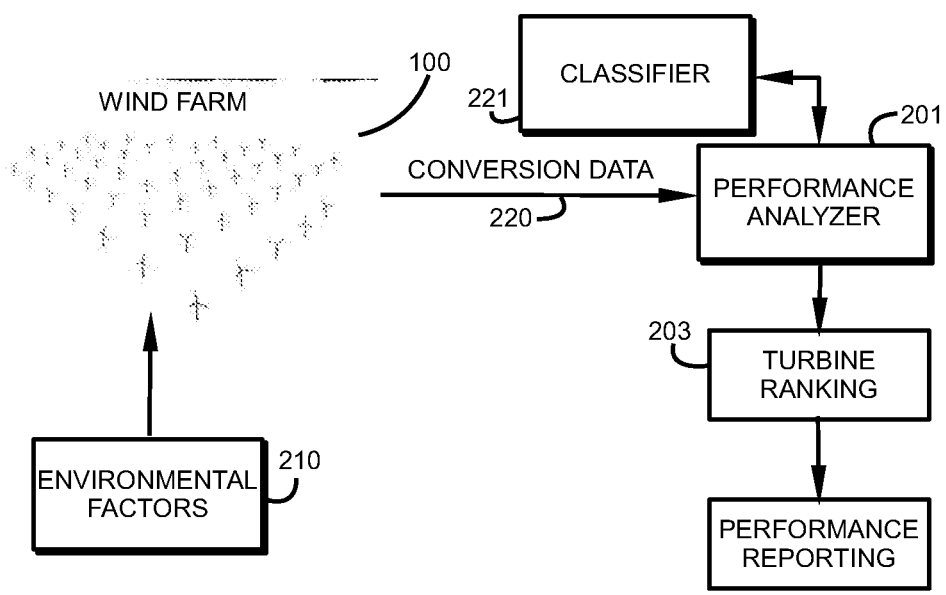
FIG. 2 is a block diagram of a system for monitoring performance of turbines in a multi-agent system according to aspects of embodiments of this disclosure.
Figure 3:
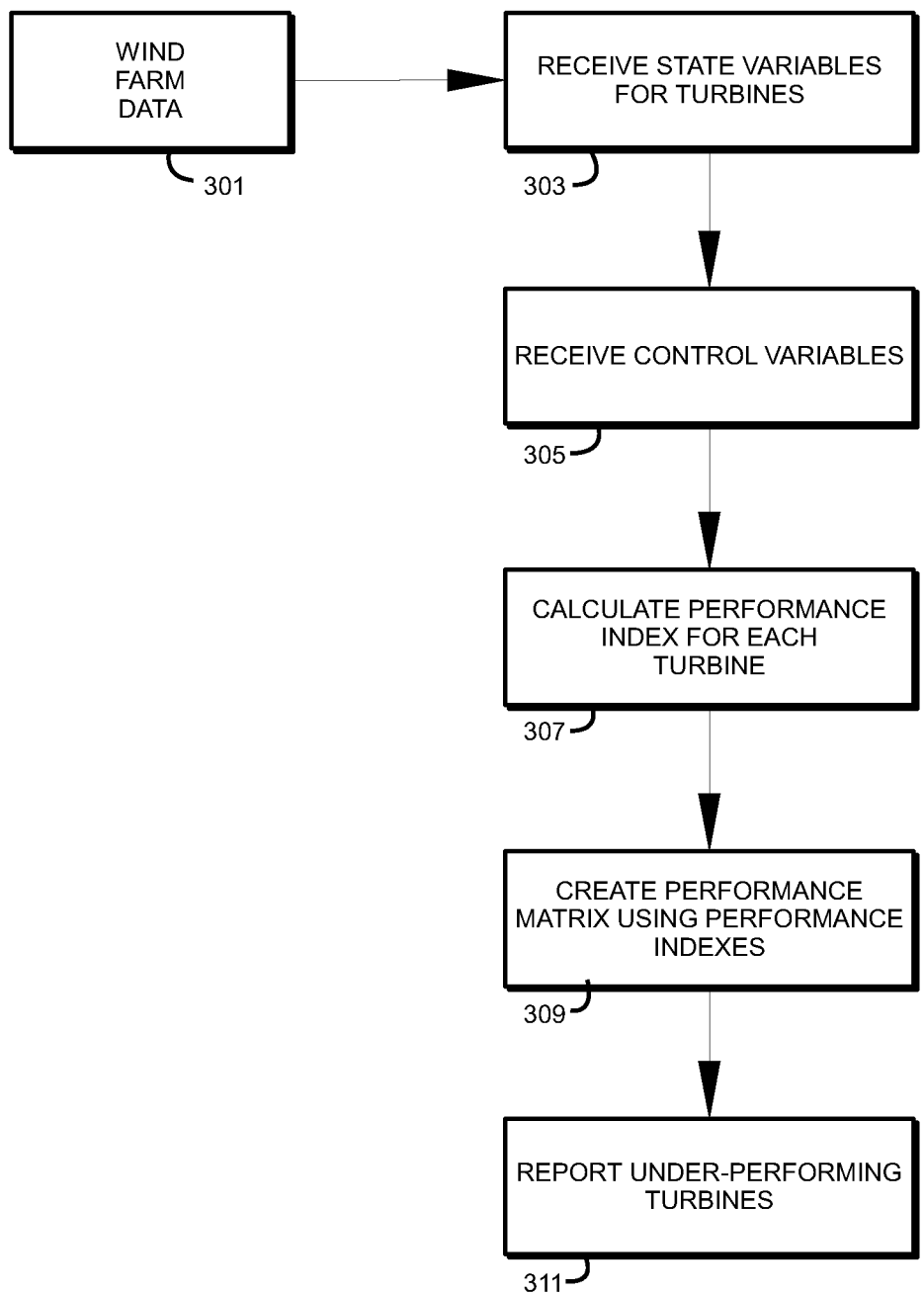
FIG. 3 is a block diagram of a method for monitoring performance of turbines in a multi-agent system according to aspects of embodiments of this disclosure.

FIG. 2 provides a block diagram of a system for monitoring performance of agents in a multi-agent cooperative system. A wind farm 100 is subject to environmental factors 210, including wind speed and direction that allows the conversion of kinetic energy of air represented as wind speed, to electrical energy derived from force applied to the surface of the turbine blades. Information relating to the conversion of wind to electrical energy creates conversion data 220. The conversion data is presented to a performance analyzer 201. The performance analyzer 201 may include a computer processor specifically configured for receiving, processing and acting on conversion data from a multi-agent system, such as the multi-agent system wind farm 100. The performance analyzer 201 performs analysis of the conversion data 220 and may calculate a performance index for each turbine in wind farm 100. A classifier 221 is in communication with the performance analyzer and identifies subsets of turbines (e.g., agents) that have identical configurations. Agents having identical configurations may be expected to convert the same amount of energy, all factors being equal. These performance comparable agents may be compared to identify specific agents that are not performing as expected. Further processing of the conversion data 220 may identify a wind turbine that is under performing. An optimization may be performed to generate turbine control data 203 that is determined to improve the performance of the identified wind turbine. The turbine control data 203 is fed back to the turbine in the wind farm 100 to effect the controls of the wind turbine to improve the wind turbine's performance. The wind turbine will provide updated conversion data 220 which will again be analyzed by performance analyzer 201 to determine the updated operation state of the turbine.

Presented herein below is a method for estimating the efficiency loss of a class of multi-agent stochastic dynamic systems, resource allocation or conversion systems, being application examples. We require no construction of any actual or statistical performance curves. The method is data-driven, requiring the observation of only sensitive state and action variables for each agent. An estimator of extractable resource is generated, and a new performance index for each agent is computed. A ranking mechanism is presented based on these performance indices. We use the indices and ranking to formulate the performance maximization problem as a stochastic dynamic game. Preliminary numerical results showed that the proposed method successfully captured some real cases of under-performance.

Notation used throughout this description can be summarized as follows. A lowercase letter (e.g., x) denotes a vector. An uppercase letter (e.g., A) denotes a matrix. A calligraphic symbol denotes a feasible set. For example, the symbol $\mathcal{X}$ denotes the feasible set of the variable x. Latin lowercase letters are used to denote primal variables. Lowercase Greek letters are used to denote dual variables. If x is a variable, then $\underline{x}$ and $\bar{x}$ denote its lower bound and upper bound, respectively. If i is an element of a countable set S, we write $-i \triangleq S \setminus \{i\}$; that is all the elements of the set, except i. If x denotes a vector, then $n_x$ and $\mathcal{X}$ denote the dimension and feasible set, respectively, of x. $\mathbb{E}[x]$ or $\mathbb{E}x$ is used as shorthand for the expected value of x. We write $\mathbb{E}[x|y]$ as the conditional expectation of x given y. Let $\{y_t\}$ be a sequence of random vectors. The symbol $\mathbb{H}_t^y$ denotes the Hilbert space spanned by the vectors $\{y_0, \ldots, y_t\}$; that is, $\mathbb{H}_t^y = \text{span}\{y_0, \ldots, y_{t+}\}$. The symbol $\mathbb{H}_{(t)}^y$ denotes the Hilbert space spanned by $y_t$ (i.e. at time t only): $\mathbb{H}_{(t)}^y = \text{span}\{y_t\}$. We write $y_{t|s}$ to denote the projection $\mathbb{H}_{(t)}^y$ onto $\mathbb{H}_s^y$. If $\mathcal{V}$ is a vector space, $\dim(\mathcal{V})$ denotes the dimension of $\mathcal{V}$. Other symbols with a narrower scope, such as auxiliary variables, in the subsections where they are used. The symbol $\succeq$; denotes a binary relation on some set of alternatives $\mathcal{X}$, allowing the comparison of pairs of alternatives x, y$\in \mathcal{X}$. The notation x$\succeq$y is shorthand for, "x is at least as good as y". The binary relation symbols $\succ$ and $\sim$ denote string or strong preference and indifference, respectively.

The problem is to monitor the performance of a class of dynamic system of distributed cooperative agents. Resource allocation and conversion systems are examples of application. There are multiple agents. The agents operate in unknown environmental conditions. The agents are coupled (or networked) via the environment or their actions.

A tool is required, which shall monitor, automatically or on-demand, the subset of underperforming agents.

The tool shall compute an estimate of the performance degradation.

The tool shall submit its findings to a remote diagnostics team for further evaluation and actions.

A wind turbine is a controlled system that converts kinetic energy from the ambient weather into electric energy. Wind turbines are an important asset in the renewable energy production portfolio. The DOE supports research and development towards achieving a 20% penetration of wind in electricity production in the United States by 2030. Wind turbines generally operates in remote sites, under random weather conditions, and often costly-to-access sites. A site may be onshore or offshore. It is of paramount energy relevance to monitor fleets of turbines in order to detect any under-performing turbines, to improve their energy extraction efficiency, or to schedule maintenance. Much of the research on wind turbine performance optimization has focused on single turbine settings. Maximizing the performance of turbines in a multi-turbine site is more complex due to inter-turbine aerodynamics. Hence much of the existing technology is highly inefficient for optimizing energy extraction from wind turbines. The current industry standard wind turbine performance monitoring technology is based on a mapping of wind speed versus extracted energy. This mapping is called a power curve. The International Electrotechnical Commission standardized the estimation of the power curve using a nonparametric approach, known as the "binning method". Given the wind speed and extracted energy observation data, the binning method divides the domain of wind speed into a finite number of intervals or bins. The power curve is then obtained as a mapping of sample mean of wind speed versus sample mean of extracted energy, using all observation data falling within each bin. For a given wind speed, the corresponding extracted energy is the sample conditional expected value of the extracted energy over the period considered: $\mathbb{E}[y_{ap}^{tb}|x_s^{tb}]$. Once constructed, the power curve is then used to predict extracted energy at any wind speed, by mapping or interpolation. This methodology requires prior construction of power curves, which may be meaningful only after observing data over a sufficiently long period of time. More recent methodology proposes to use machine learning to create multi-variable models of turbine performance, when sufficient information is available. An ensemble of regression trees has been suggested to predict turbine extracted energy as a function of several inputs, including shear, wind speed, and hub height turbulence. These methods are instances of the "random forest" method. Other research presents a list of commonly-used input variables. Also proposed is an additive multivariate kernel method that can include the aforementioned weather factors as a new power curve model. Note that a power curve, in this case, is a high-dimensional manifold. Multi-variable methods require prior construction of high-dimensional power curves, which may be meaningful only after observing data over a sufficiently long period of time. In essence, they require more data and are more difficult to understand and to implement than the current standard practice.

Consider a set $\mathcal{I} \subset \mathbb{N}$ of performance-comparable wind turbines commissioned in a geographic site. Let $x_{it}^{tb}$, for all $i \in \mathcal{I}$, denote the multi-variable state process with components. Let $u_{it}^{tb}$ for all $i \in \mathcal{I}$, denote the multi-variable control process with components $u_{gsit}^{tb}$, $u_{patbk}^{tb}$, and $u_{ypit}^{tb}$. Let $u_{apit}^{tb}$ for all $i \in \mathcal{I}$ denote the extracted resource.

Assume that the weather variables can be represented by stochastic differential equations driven by the Wiener processes. For simplicity, without loss of generality, consider Itô drift-diffusion processes, for $t \in \mathcal{I}$:

$$dx_{it} = u_{it}dt + \sigma_{it}dw_{it}, \forall i \in \mathcal{I}, \qquad (1)$$

where $w_{it}$, for all I are standard Wiener processes. The first and second terms on the right-hand side of the equation are drift and diffusion components, respectively.

For notational conciseness and simplicity, the differential forms in Equation (1) are used interchangeably with their respective integral forms or discrete approximations. Accordingly, Equation (1) is equivalent to:

$$x_{it} = x_{i0} + \int_0^t \mu_{it}dt + \int_0^t \sigma_{it}dw_{it}, \forall i\mathcal{I} \qquad (2)$$

where the last term is an Itô integral.

The use of stochastic differential equations is common in various fields dealing with weather factors. It has been proposed that a drift-diffusion process be used to model temperature dynamics with seasonal stochastic volatility. The model is used to compute future prices for commonly traded contracts in the Chicago Mercantile Exchange on indices like cooling and heating degree days, and cumulative average temperatures, as well as option prices on these indices. Synoptic variability of mid-latitude seas surface winds (obtained from 6 hourly scatter ohmmeter observations) can be well described using a univariate Itô drift-diffusion stochastic differential equation.

Some definitions used throughout this description will now be described.

An extractable resource $\tilde{a}_{it}$ is a function of the state variables, independent of the agents' actions: $\tilde{a}_{it} \triangleq \tilde{a}_{it}(x_{it})$.

An extracted resource is a function of the state and agents' action variables:

$$y_{apit}^{tb} \triangleq y_{apit}^{tb}(u'_{gsit}{}^{tb}, u'_{pait}{}^{tb}, u'_{ypit}{}^{tb}, x'_{apit}{}^{tb}) \qquad (3)$$

P-Comparable Turbines are turbines that for two turbines l and j, for any $i,j \in \mathcal{I}$ are performance comparable, or p-comparable if thy have identical design characteristics. Note that any turbine is p-comparable with itself. Given $i,j,k \in \mathcal{I}$, if i is p-comparable with j, then j is p-comparable with i; if i is p-comparable with j and j is p-comparable with k, then i is p-comparable with k. Hence the collection of p-comparable turbines defines a partition of $\mathcal{I}$.

Strongly P-Comparable States—Let $i,j \in \mathcal{I}$ be a pair of p-comparable turbines. Let, $s,t \in [0, T]$ be two time instants. Let $x_{-sis}^{tb}$ and $x_{-sjt}^{tb}$ be the corresponding weather process state sub-vectors; i.e., excluding the wind speed components. Then $x_{is}^{tb}$ and $x_{jt}^{tb}$ are strongly p-comparable, if $$\mathbb{E}\|x_{-sis}^{tb} - x_{-sjt}^{tb}\| = 0 \qquad (4)$$

Note that any state is strongly p-comparable with itself. Given three sub-vectors $x_{-s1}^{tb}$, $x_{-s2}^{tb}$ and $x_{-s3}^{tb}$, if $x_{-s1}^{tb}$ is strongly p-comparable with $x_{-s2}^{tb}$, then $x_{-s2}^{tb}$ is strongly p-comparable with $x_{-s1}^{tb}$. If $x_{-s1}^{tb}$ is strongly p-comparable with $x_{-s2}^{tb}$ and $x_{-s2}^{tb}$ is strongly p-comparable with $x_{-s3}^{tb}$, then $x_{-s1}^{tb}$ is strongly p-comparable with $x_{-s3}^{tb}$. Hence the collection of strongly p-comparable states defines a partition of the set of states. While the concept of strongly p-comparable states is easily understood, the referenced conditions may be somewhat restrictive for practical purposes. For example, as stated above, the wind industry currently stores data averaged over 10-minute intervals. Moreover, some physical variables (e.g. turbulence) may be well-defined over a non-vanishing time interval. Therefore, a concept of a weakly P-Comparable State is useful and defined below.

Weakly P-Comparable States—Let i,j∈ $\mathcal{J}$ be a pair of p-comparable turbines. Let s,t∈ [0, T] be two time instants. Let $x_{-sis}^{tb}$ and $x_{-sjt}^{tb}$ be the corresponding weather process state sub-vectors; i.e. excluding the wind speed components. Then $x_{is}^{tb}$ and $x_{jt}^{tb}$ are p-comparable, if there exists Δt>0 such that:

$$\mathbb{E}\int_{t-\Delta t}^{t}\|x_{-si\tau}^{tb} - x_{-sj(s-t-\tau)}^{tb}\|d\tau = 0. \tag{5}$$

Equation (5) is equivalent to the following conditions:

$$\mathbb{E}\int_{s}^{s}\frac{\partial X_{apit}^{tb}}{\partial x_{-sit}^{tb}}dx_{-sit}^{tb} + \mathbb{E}\int_{0}^{T}\frac{1}{2}\frac{\partial^{2} x_{apit}^{tb}}{\partial^{2} x_{-sit}^{tb}}dt + \mathbb{E}\int_{0}^{T}\frac{\partial^{2} x_{apit}^{tb}}{\partial x_{sit}^{tb}\partial x_{-sit}^{tb}}d[x_{s}^{tb}, x_{-s}^{tb}]_{it} = 0 \tag{6}$$

Extractable Power Estimator—Let $\varepsilon_{it}$ be the set of all states that are non-anticipatively p-comparable with the state of turbine i∈ $\mathcal{J}$ at time t∈ [0, T]. Then a (non-anticipative) estimator of the extractable resource of i at t is given by:

$$y_{apit|t}^{tb} = \max_{(j,t)\in\varepsilon_{it}}\left\{\mathbb{E}\int_{\mathcal{T}_t}y_{apj\mathcal{T}}^{tb}d\mathcal{T}:\mathbb{E}\int_{\mathcal{T}_t}x_{sj\mathcal{T}}^{tb}d\mathcal{T} \leq \mathbb{E}\int_{\mathcal{T}_t}x_{si\mathcal{T}}^{tb}d\mathcal{T}\right\}, \tag{7}$$
$$\forall i\in\mathcal{J}, \forall t\in\mathcal{T}$$

$$y_{piit}^{tb} = y_{apit|t}^{tb} - \mathbb{E}\int_{\mathcal{T}_t}y_{apj\mathcal{T}}^{tb}d\mathcal{T}, \forall i\in\mathcal{J}, \forall t\in\mathcal{T} \tag{8}$$

Based on this definition, a novel performance index is produced for each state as a measure of under-performance of a turbine. Recalling that a state is defined by a turbine and a time t∈ [0, T] the performance index is defined as the new index as the extracted resource below an adapted threshold. Note that, by definition, $y_{apit|t}^{tb} \geq \mathbb{E}\int_{\mathcal{J}_t} y_{apj\mathcal{J}}^{tb}d\mathcal{J}$. Hence, $y_{piit}^{tb} \geq 0$. Integrating over the period [0, t] yields a corresponding performance energy index:

$$y_{eiit}^{tb} = \int_{0}^{t}y_{pii\tau}^{tb}d\tau, \forall i\in\mathcal{J}, \forall t\in\mathcal{J} \tag{9}$$

FIG. 2 is a block diagram of a method for generating a performance index for an agent of a multi agent system, like the system of wind turbines presented in FIG. 1 and FIG. 2. The wind farm generates data 301 including state variables relating to each wind turbine in the wind turbine system. The state variables are received by a performance analysis processor 303. In addition, the control variables relating to the wind turbine are received by the performance analyzer 305. The performance index is represented as the difference between the extracted resource as compared to a threshold that represents full performance of the wind turbine 307. The performance index of a first turbine is compared to the performance index of other comparable turbines 309. The result of the comparison identifies wind turbines that are underperforming based on the performance indexes 311.

The mapping $-y_{pi}^{tb}(\cdot)$ is a utility function on p-comparable equivalence classes. Intuitively, if $s^{tb}i$ and $s^{tb}j$ belong to the equivalence class. Then, the following is true:

$$s_i^{tb} \geq s_j^{tb} \Leftrightarrow y_{pii}^{tb}(s_i^{tb}) \geq y_{pij}^{tb}(s_j^{tb}) \tag{10}$$

Positive Matrix—A matrix S is positive if $S_{ij} > 0$ for all i and j.

Column-Stochastic Matrix—An n×n matrix L is a column-stochastic matrix if all its components are nonnegative and the sum of all components in each column is equal to one; that is $\ell_{ij} \geq 0, \forall i,j$ and $\Sigma_i \ell_{ij} = 1$, for all j, respectively.

Performance Graph—Consider n p-comparable states, n>1, $<x_k^{tb}$, k=1, ..., n>. A performance graph is a directed graph G(V, E) Where V and E denotes the sets of vertices and edges, respectively. Each state represents a vertex. A directed edge is defined from some vertex $e_i$ to some vertex $e_j$ if and only if the state $s_i$, is strongly preferred to $s_j$.

Given the above definitions, there are two problems faced. The first is estimation and the second is performance maximization. For the estimation problem, given observations on the weather, control and extracted resource processes, z (x,u,z) over a time period [0,t], find a function $h^0$ in the class of measurable functions that satisfies:

$$\inf \mathbb{E}\|x_{apit(t+\tau)}^{tb} - h(\{z^{tb}\}_0^t)\| = \mathbb{E}\|x_{apit(t+\tau)}^{tb} - h^0(\{z^{tb}\}_0^t)\|$$
$$\|<\infty \tag{11}$$

Regarding performance maximization, the problem is to find feasible control processes $u_{gsi}^{tb}$, $u_{pai}^{tb}$, and $u_{ypi}^{tb}$, for all i∈ $\mathcal{J}$, that extracts the closes value from the extractable resource, or more formally:

$$\hat{u}_i^{tb} = \tag{12}$$
$$\arg\min_{u_i^{tb}\in\mathcal{U}}\|x_{api}^{tb} - y_{api}^{tb}\| = \hat{u}_i^{tb} = \arg\min_{u_{gsi}^{tb},u_{pai}^{tb},u_{ypi}^{tb}}\mathbb{E}\int_{0}^{T}|x_{apit}^{tb} - y_{apit}^{tb}|dt$$

Clearly, barring any binding operational or design constraints, each turbine operates insomuch as to efficiently convert the available kinetic energy into electric energy. This is achieved by automatically adjusting the control variables. In basic terms, it may be said that any turbine whose operation deviates from a given maximum energy extraction engineering design principle is under-performing. Performance monitoring aims to detect any under-performing turbine. Performance maximization aims at improving the performance of any under-performing turbine.

A new method for solving the estimation and performance maximization problems is described with the following assumptions. First, the extracted energy is a monotone non-decreasing function of wind speed, for a fixed air density. More formally, given a turbine, say $i \in \mathcal{J}$, and two time instants, say $t_1, t_2 \in \mathcal{T}$, if every variable or parameter, except the wind speed that is correlated with the extracted energy variable remain constant in probability, then the following condition must hold in probability:

$$x_{sit_1}^{tb} \leq x_{sit_2}^{tb} \overset{P}{\Rightarrow} y_{apit_1}^{tb} \leq y_{apit_2}^{tb} \quad (13)$$

Thus, any violation of the necessary condition in equation (13) is an indication of under-performance of turbine i at time $t_2$.

Further, given two turbines, say $i,j \in \mathcal{I}$, and a time instant, say $t_1 \in \mathcal{T}$, if every variable or parameter, except the wind speed, that is correlated with the extracted energy variable, are identical in probability, then the following condition must hold in probability:

$$x_{sit_1}^{tb} \leq x_{sJt_2}^{tb} \overset{P}{\Rightarrow} y_{apit_1}^{tb} \leq y_{apjt_1}^{tb} \quad (14)$$

Thus, any violation of the necessary condition in equation (14) is an indication of under-performance of turbine j at time $t_1$.

Presently, industry standard wind turbine performance monitoring practice recommends that data be acquired, averaged over 10 minutes, and stored, because wind speeds are considered stationary and other environmental factors nearly constant over a 10-minute period. The systems and methods of the present invention are improvements that eliminate the need for creating complex power curves that require extended periods of operations monitoring to be useful.

A novel performance ranking score is now introduced for ranking wind turbines over a given time period based on their performance. The performance ranking score uses efficiency loss estimates using the concept of positive column stochastic matrices and related linear algebra techniques to produce a meaningful performance ranking score. Based on the definitions for positive and column-stochastic matrices it will be understood that every column stochastic matrix has an eigenvalue of one. If a matrix S is positive and column stochastic, any eigenvector in $\mathcal{V}_1 S$ has all positive or all negative components. If v and w are linearly independent vectors in in $\mathbb{R}^n$, n≥2. Then, for some values of s and t that are not both zero, the vector x=sv+tw has both positive and negative components. Finally, if S is positive and column-stochastic then $\dim(\mathcal{V}_1(S))=1$.

With the aforementioned principles, a positive column stochastic matrix S based on the performance index concept is presented. Given S, solve the linear algebraic system Sx=x subject $\|x\|_1=1$ to obtain the unique solution x*. Ordering the components of x* in decreasing order yields a unique ranking of turbines in decreasing order of performance.

The performance score matrix may be constructed as an n×n matrix S as a convex combination of n×n link matrices $L_i$, $i \in \{0,1,2\}$ according to:

$$\alpha_0 \in (0, 1], \alpha_1, \alpha_2 \in [0.1], \quad (15a)$$

$$\alpha_0 + \alpha_1 + \alpha_2 = 1, \quad (15b)$$

$$\ell_{ij}^0 = \frac{1}{n}, \forall i, j \quad (15c)$$

$$\ell_{ij}^1 = \frac{\mathbb{E} \int_{t_0}^T u_{ij}(t) dt}{\sum_{i'=1}^n \mathbb{E} \int_{t_0}^T u_{i'j}(t) dt}, \forall i, j \quad (15d)$$

$$\ell_{ij}^2 = \frac{\mathbb{E} \int_{t_0}^T p_{ij}(t) dt}{\sum_{i'=1}^n \mathbb{E} \int_{t_0}^T p_{i'j}(t) dt}, \forall i, j \quad (15e)$$

$$S = \alpha_0 L_0 + \alpha_1 L_1 + \alpha_2 L_2, \quad (15f)$$

Where $u_{ij}$ is a binary variable that is equal to 1 if there is a link from node i to j, or 0, otherwise; $p_{ij}$ denotes the performance index of i with respect to j. Here, we use the convention $$\frac{0}{0} := 0.$$

The ranking score vector is the solution to the following linear equation:

$$x = S_x. \quad (16)$$

Figure 4:
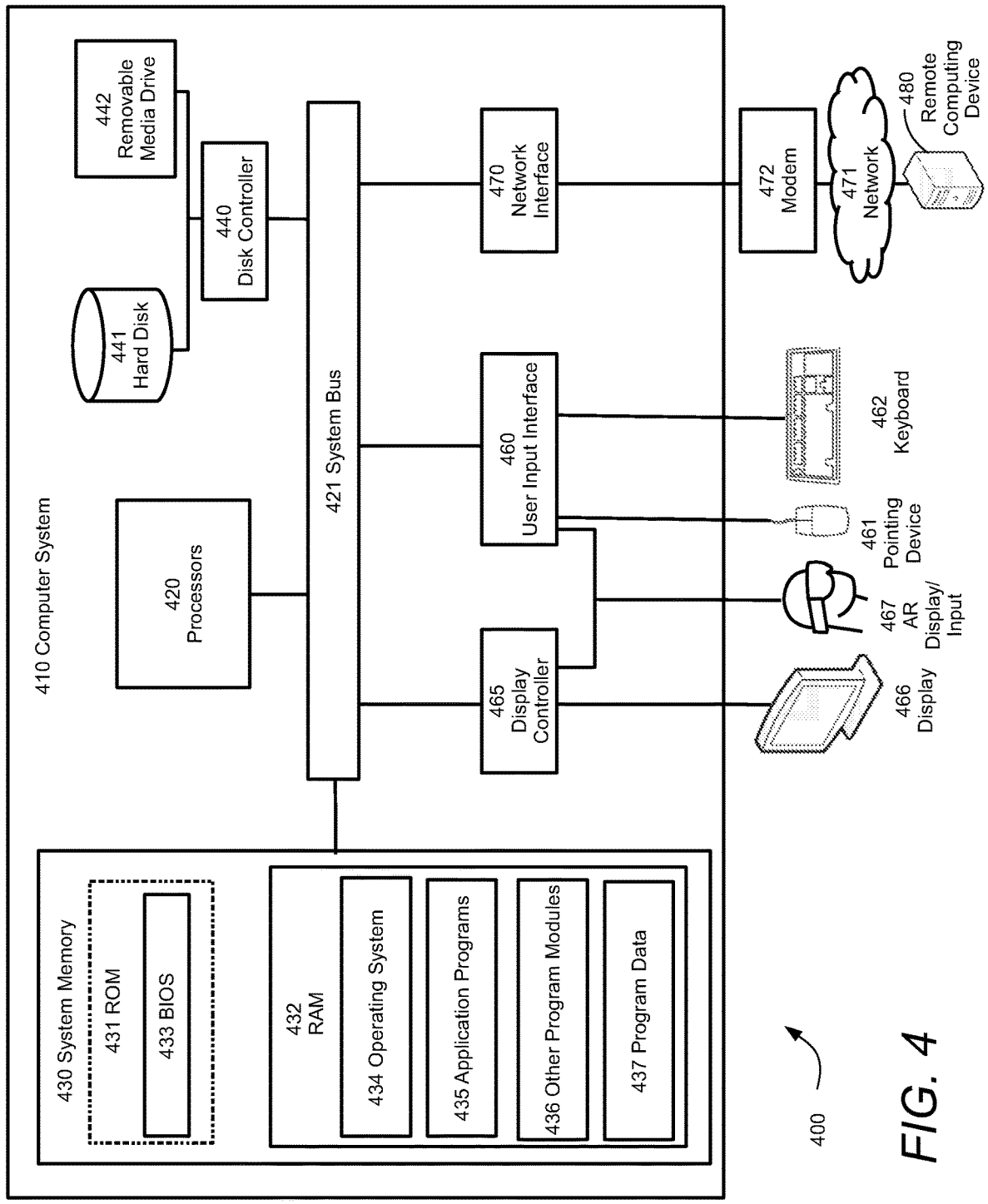
FIG. 4 is a block diagram

FIG. 4 illustrates an exemplary computing environment 400 within which embodiments of the invention may be implemented. Computers and computing environments, such as computer system 410 and computing environment 400, are known to those of skill in the art and thus are described briefly here.

As shown in FIG. 4, the computer system 410 may include a communication mechanism such as a system bus 421 or other communication mechanism for communicating information within the computer system 410. The computer system 410 further includes one or more processors 420 coupled with the system bus 421 for processing the information.

The processors 420 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 4, the computer system 410 also includes a system memory 430 coupled to the system bus 421 for storing information and instructions to be executed by processors 420. The system memory 430 may include computer readable storage media in the form of volatile and/or nonvolatile memory, such as read only memory (ROM) 431 and/or random access memory (RAM)

432. The RAM 432 may include other dynamic storage device(s) (e.g., dynamic RAM, static RAM, and synchronous DRAM). The ROM 431 may include other static storage device(s) (e.g., programmable ROM, erasable PROM, and electrically erasable PROM). In addition, the system memory 430 may be used for storing temporary variables or other intermediate information during the execution of instructions by the processors 420. A basic input/output system 433 (BIOS) containing the basic routines that help to transfer information between elements within computer system 410, such as during start-up, may be stored in the ROM 431. RAM 432 may contain data and/or program modules that are immediately accessible to and/or presently being operated on by the processors 420. System memory 430 may additionally include, for example, operating system 434, application programs 435, other program modules 436 and program data 437.

The computer system 410 also includes a disk controller 440 coupled to the system bus 421 to control one or more storage devices for storing information and instructions, such as a magnetic hard disk 441 and a removable media drive 442 (e.g., floppy disk drive, compact disc drive, tape drive, and/or solid state drive). Storage devices may be added to the computer system 410 using an appropriate device interface (e.g., a small computer system interface (SCSI), integrated device electronics (IDE), Universal Serial Bus (USB), or FireWire).

The computer system 410 may also include a display controller 465 coupled to the system bus 421 to control a display or monitor 466, such as a cathode ray tube (CRT) or liquid crystal display (LCD), for displaying information to a computer user. The computer system includes an input interface 460 and one or more input devices, such as a keyboard 462 and a pointing device 461, for interacting with a computer user and providing information to the processors 420. The pointing device 461, for example, may be a mouse, a light pen, a trackball, or a pointing stick for communicating direction information and command selections to the processors 420 and for controlling cursor movement on the display 466. The display 466 may provide a touch screen interface which allows input to supplement or replace the communication of direction information and command selections by the pointing device 461. In some embodiments, an augmented reality device 467 that is wearable by a user, may provide input/output functionality allowing a user to interact with both a physical and virtual world. The augmented reality device 467 is in communication with the display controller 465 and the user input interface 460 allowing a user to interact with virtual items generated in the augmented reality device 467 by the display controller 465. The user may also provide gestures that are detected by the augmented reality device 467 and transmitted to the user input interface 460 as input signals.

The computer system 410 may perform a portion or all of the processing steps of embodiments of the invention in response to the processors 420 executing one or more sequences of one or more instructions contained in a memory, such as the system memory 430. Such instructions may be read into the system memory 430 from another computer readable medium, such as a magnetic hard disk 441 or a removable media drive 442. The magnetic hard disk 441 may contain one or more datastores and data files used by embodiments of the present invention. Datastore contents and data files may be encrypted to improve security. The processors 420 may also be employed in a multi-processing arrangement to execute the one or more sequences of instructions contained in system memory 430. In alternative embodiments, hard-wired circuitry may be used in place of or in combination with software instructions. Thus, embodiments are not limited to any specific combination of hardware circuitry and software.

As stated above, the computer system 410 may include at least one computer readable medium or memory for holding instructions programmed according to embodiments of the invention and for containing data structures, tables, records, or other data described herein. The term "computer readable medium" as used herein refers to any medium that participates in providing instructions to the processors 420 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 441 or removable media drive 442. Non-limiting examples of volatile media include dynamic memory, such as system memory 430. Non-limiting examples of transmission media include coaxial cables, copper wire, and fiber optics, including the wires that make up the system bus 421. Transmission media may also take the form of acoustic or light waves, such as those generated during radio wave and infrared data communications.

The computing environment 400 may further include the computer system 410 operating in a networked environment using logical connections to one or more remote computers, such as remote computing device 480. Remote computing device 480 may be a personal computer (laptop or desktop), a mobile device, a server, a router, a network PC, a peer device or other common network node, and typically includes many or all of the elements described above relative to computer system 410. When used in a networking environment, computer system 410 may include modem 472 for establishing communications over a network 471, such as the Internet. Modem 472 may be connected to system bus 421 via user network interface 470, or via another appropriate mechanism.

Network 471 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 410 and other computers (e.g., remote computing device 480). The network 471 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 471.

An executable application, as used herein, comprises code or machine-readable instructions for conditioning the processor to implement predetermined functions, such as those of an operating system, a context data acquisition system or other information processing system, for example, in response to user command or input. An executable procedure is a segment of code or machine-readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof.

What is claimed is:

1. A method for identifying underperforming agents in a multi-agent cooperative system comprising:
   defining a subset of agents from a plurality of agents, where each agent in the subset is performance comparable, having identical design characteristics;
   calculating in a performance analyzer processor, an estimated extractable resource for each agent in the subset of agents as a function of state variables of the agent, wherein the estimated extractable resource is a maximum estimated value for the agent based on comparable agent states over a given time interval, based on prior data received from the multi-agent cooperative system;
   calculating, in the performance analyzer processor, an extracted resource for each agent in the subset of agents as a function of the state variables of the agent and control variables of the agent;
   calculating a performance index as a difference between the calculated extracted resource of the agent and the estimated extractable resource representative of a full performance of the agent;
   arranging performance indexes for a group of performance comparable turbines into a positive column stochastic matrix and solving the positive column stochastic matrix to solve for a vector containing performance indexes for each of the turbines in the group of performance comparable turbines;
   ordering the solved vector to present the performance indexes in decreasing order;
   identifying an agent as an under-performing agent based on the relative position of the agent in the ordered vector of performance indexes;
   performing an optimization on an identified under-performing agent to calculate updated control information; and
   updating the identified under-performing agent with the updated control information.

2. The method of claim 1, wherein the agents comprise wind turbines and the multi-agent cooperative system is a wind farm.

3. The method of claim 2, further comprising:
   receiving state information for each wind turbine in the wind farm; and
   receiving control information for each wind turbine in the wind farm, wherein the state information and the control information is used to calculate the performance index.

4. The method of claim 3, further comprising:
   receiving weather information for calculating the performance index.

5. The method of claim 4, wherein the weather information excludes wind speed information.

6. The method of claim 1, further comprising:
   receiving updated state information from the updated agent; and
   calculating an updated performance index for corresponding agent.

7. The method of claim 1, further comprising:
   determining the threshold value of the extracted resource value for a subset of the plurality of agents, wherein each agent in the subset is performance comparable with each other agent in the subset.

8. The method of claim 7, wherein each agent in the subset of performance comparable agents has a same configuration as each other agent in the subset of performance comparable agents.

9. The method of claim 1, further comprising:
   calculating the performance index comprising integrating the estimated extracted resource value of each agent over a selected time interval.

10. A system for identifying under-performing agents in a plurality of agents in a multi-agent cooperative system comprising:
    a performance analyzing processor in communication with the multi-agent cooperative system;
    a communications port in the performance analyzing processor for receiving state information for each agent in the plurality of agents and control information for each agent in the plurality of agents;
    a classifier for identifying a subset of agents in the plurality of agents that are performance comparable, having identical design characteristics;
    a non-transitory computer memory containing instructions that when executed by the performance analyzing processor cause the performance analyzing processor to:
      calculate an estimated extractable resource for each agent in the subset of agents as a function of state variables of the agent, wherein the estimated extractable resource is a maximum estimated value for the agent based on comparable agent states over a given time interval, based on prior data received from the multi-agent cooperative system;
      calculate an extracted resource for each agent in the subset of agents as a function of the state variables of the agent and control variables of the agent; and calculate a performance index as a difference between an extracted resource value for each agent and a threshold resource value, the extracted resource value being a function of state variables and control variables of the agent;

arrange performance indexes for a group of performance comparable turbines into a positive column stochastic matrix and solving the positive column stochastic matrix to solve for a vector containing performance indexes for each of the turbines in the group of performance comparable turbines;

ordering the solved vector to present the performance indexes in decreasing order;

identifying an agent as an under-performing agent based on the relative position of the agent in the ordered vector of performance indexes;

an optimizer configured to identify an under-performing agent of the subset of performance comparable agents based on the relative position of the agent in the ordered vector of performance indexes; and an interface between the optimizer and the identified under-performing agent configured to transfer the updated control information from the optimizer to the identified under-performing agent.

11. The system of claim 10, wherein each agent in the plurality of agents is a wind turbine and the multi-agent cooperative system is a wind farm.

12. The system of claim 11, wherein the state information is state information representative of a state of each wind turbine in the wind farm.

13. The system of claim 11, wherein the control information is representative of control aspects of each wind turbine in the wind farm.

14. The system of claim 11, wherein the performance analyzing processor is configured to receive information relating to weather information relative to the wind farm.

15. The system of claim 14, wherein the weather information excludes information relating to wind speed.

16. The system of claim 10, wherein the subset of agent that are performance comparable have identical design characteristics.

17. The system of claim 10, wherein the performance analyzing processor is further configured to calculate a performance index for each agent in a group of performance comparable agents and identify the under-performing agent based on the performance index.

18. The system of claim 10, wherein the performance index is calculated as an integration of an estimated extracted resource of each agent over a selected time period.

* * * * *